(12) United States Patent
Sweeney et al.

(10) Patent No.: US 8,943,016 B2
(45) Date of Patent: Jan. 27, 2015

(54) SYSTEMS AND METHODS FOR SEMANTIC CONCEPT DEFINITION AND SEMANTIC CONCEPT RELATIONSHIP SYNTHESIS UTILIZING EXISTING DOMAIN DEFINITIONS

(71) Applicant: Primal Fusion Inc., Waterloo (CA)

(72) Inventors: Peter Sweeney, Kitchener (CA); Alexander David Black, Guelph (CA)

(73) Assignee: Primal Fusion Inc., Waterloo (CA)

( * ) Notice: Subject to any disclaimer, the term of this patent is extended or adjusted under 35 U.S.C. 154(b) by 0 days.

(21) Appl. No.: 13/919,934

(22) Filed: Jun. 17, 2013

(65) Prior Publication Data
US 2013/0282647 A1    Oct. 24, 2013

Related U.S. Application Data

(63) Continuation of application No. 12/549,812, filed on Aug. 28, 2009, now Pat. No. 8,495,001.

(60) Provisional application No. 61/092,973, filed on Aug. 29, 2008.

(51) Int. Cl.
| | | |
|---|---|---|
| *G06N 5/04* | (2006.01) | |
| *G06N 5/02* | (2006.01) | |
| *G06F 17/30* | (2006.01) | |

(52) U.S. Cl.
CPC .......... *G06N 5/022* (2013.01); *G06F 17/30731* (2013.01)
USPC ............................................... 706/55

(58) Field of Classification Search
CPC ..................................... G06N 5/042
USPC ........................... 706/55; 707/100
See application file for complete search history.

(56) References Cited

U.S. PATENT DOCUMENTS

| | | | |
|---|---|---|---|
| 3,943,462 | A | 3/1976 | Thompson |
| 4,532,813 | A | 8/1985 | Rinehart |

(Continued)

FOREIGN PATENT DOCUMENTS

| | | |
|---|---|---|
| CA | 2734756 A1 | 3/2010 |
| CN | 1395193 A | 2/2003 |

(Continued)

OTHER PUBLICATIONS

Office Action for U.S. Appl. No. 12/549,812 mailed on Oct. 1, 2012.

(Continued)

*Primary Examiner* — Jeffrey A Gaffin
*Assistant Examiner* — Ola Olude Afolabi
(74) *Attorney, Agent, or Firm* — Wolf, Greenfield & Sacks, P.C.

(57) ABSTRACT

Computer-implemented systems and methods for synthesis of concept definitions and concept relationships from a domain of data, utilizing different semantic processing protocols such as formal concept analysis and faceted classification synthesis from existing domain concepts that have a confidence gradient built into them. A cognitive of an input agent provides an input of an active concept which is matched against existing domain concepts. The resultant pool of relevant domain concepts is then used to derive virtual concept definitions using a semantic processing protocol. The derivation is then overlaid with a concept of relative proximity of an attribute from another within an attribute set. An additional layer of coherence is given by the relative proximity measure. The end result is a pool of related virtual concept definitions in a tree structure.

19 Claims, 7 Drawing Sheets

(56) References Cited

U.S. PATENT DOCUMENTS

| | | |
|---|---|---|
| 4,972,328 A | 11/1990 | Wu et al. |
| 5,056,021 A | 10/1991 | Ausborn |
| 5,193,185 A | 3/1993 | Lanter |
| 5,369,763 A | 11/1994 | Biles |
| 5,745,910 A | 4/1998 | Piersol et al. |
| 5,793,376 A | 8/1998 | Tanaka et al. |
| 5,835,758 A | 11/1998 | Nochur et al. |
| 5,911,145 A | 6/1999 | Arora et al. |
| 5,937,400 A | 8/1999 | Au |
| 5,953,726 A | 9/1999 | Carter et al. |
| 6,006,222 A | 12/1999 | Culliss |
| 6,078,916 A | 6/2000 | Culliss |
| 6,098,033 A | 8/2000 | Richardson et al. |
| 6,138,085 A | 10/2000 | Richardson et al. |
| 6,167,390 A | 12/2000 | Brady et al. |
| 6,173,276 B1 | 1/2001 | Kant et al. |
| 6,233,575 B1 | 5/2001 | Agrawal et al. |
| 6,292,792 B1 | 9/2001 | Belles et al. |
| 6,295,066 B1 | 9/2001 | Tanizaki et al. |
| 6,334,131 B2 | 12/2001 | Chakrabarti et al. |
| 6,349,275 B1 | 2/2002 | Schumacher et al. |
| 6,356,899 B1 | 3/2002 | Chakrabarti et al. |
| 6,396,864 B1 | 5/2002 | O'Brien et al. |
| 6,401,061 B1 | 6/2002 | Zieman |
| 6,499,024 B1 | 12/2002 | Stier et al. |
| 6,539,376 B1 | 3/2003 | Sundaresan et al. |
| 6,539,395 B1 | 3/2003 | Gjerdingen et al. |
| 6,556,983 B1 | 4/2003 | Altschuler et al. |
| 6,571,240 B1 | 5/2003 | Ho et al. |
| 6,694,329 B2 | 2/2004 | Murray |
| 6,751,611 B2 | 6/2004 | Krupin et al. |
| 6,751,621 B1 | 6/2004 | Calistri-Yeh et al. |
| 6,768,982 B1 | 7/2004 | Collins et al. |
| 6,772,136 B2 | 8/2004 | Kant et al. |
| 6,785,683 B1 | 8/2004 | Zodik et al. |
| 6,868,525 B1 | 3/2005 | Szabo |
| 6,976,020 B2 | 12/2005 | Anthony et al. |
| 6,980,984 B1 | 12/2005 | Huffman et al. |
| 7,007,074 B2 | 2/2006 | Radwin |
| 7,035,864 B1 | 4/2006 | Ferrari et al. |
| 7,051,023 B2 | 5/2006 | Kapur et al. |
| 7,062,466 B2 | 6/2006 | Wagner et al. |
| 7,062,483 B2 | 6/2006 | Ferrari et al. |
| 7,089,237 B2 | 8/2006 | Turnbull et al. |
| 7,120,646 B2 | 10/2006 | Streepy, Jr. |
| 7,152,065 B2 | 12/2006 | Behrens et al. |
| 7,181,465 B2 | 2/2007 | Maze et al. |
| 7,209,922 B2 | 4/2007 | Maze et al. |
| 7,225,183 B2 | 5/2007 | Gardner |
| 7,249,117 B2 | 7/2007 | Estes |
| 7,280,991 B1 | 10/2007 | Beams et al. |
| 7,283,992 B2 | 10/2007 | Liu et al. |
| 7,302,418 B2 | 11/2007 | Asahara |
| 7,319,951 B2 | 1/2008 | Rising, III et al. |
| 7,392,250 B1 | 6/2008 | Dash et al. |
| 7,406,456 B2 | 7/2008 | Calistri-Yeh et al. |
| 7,418,452 B2 | 8/2008 | Maze |
| 7,440,940 B2 | 10/2008 | Chen et al. |
| 7,478,089 B2 | 1/2009 | Henkin et al. |
| 496,593 A1 | 2/2009 | Gardner et al. |
| 7,490,073 B1 | 2/2009 | Qureshi et al. |
| 7,493,319 B1 | 2/2009 | Dash et al. |
| 7,502,810 B2 | 3/2009 | Acevedo-Aviles et al. |
| 7,580,918 B2 | 8/2009 | Chang et al. |
| 7,596,374 B2 | 9/2009 | Katou |
| 7,596,574 B2 | 9/2009 | Sweeney |
| 7,606,168 B2 | 10/2009 | Robinson et al. |
| 7,606,781 B2 | 10/2009 | Sweeney et al. |
| 7,627,582 B1 | 12/2009 | Ershov |
| 7,668,737 B2 | 2/2010 | Streepy, Jr. |
| 7,711,672 B2 | 5/2010 | Au |
| 7,716,207 B2 | 5/2010 | Odom et al. |
| 7,716,216 B1 | 5/2010 | Harik et al. |
| 7,720,857 B2 | 5/2010 | Beringer et al. |
| 7,752,199 B2 | 7/2010 | Farrell |
| 7,752,534 B2 | 7/2010 | Blanchard, III et al. |
| 7,827,125 B1 | 11/2010 | Rennison |
| 7,844,565 B2 | 11/2010 | Sweeney |
| 7,849,090 B2 | 12/2010 | Sweeney |
| 7,860,817 B2 | 12/2010 | Sweeney et al. |
| 7,945,555 B2 | 5/2011 | Sankaran et al. |
| 7,970,764 B1 | 6/2011 | Ershov |
| 8,010,570 B2 | 8/2011 | Sweeney |
| 8,281,238 B2 | 10/2012 | Sweeney et al. |
| 2002/0069197 A1 | 6/2002 | Katayama et al. |
| 2002/0078044 A1 | 6/2002 | Song et al. |
| 2002/0133483 A1 | 9/2002 | Klenk et al. |
| 2002/0194187 A1 | 12/2002 | McNeil et al. |
| 2003/0177112 A1 | 9/2003 | Gardner |
| 2003/0196094 A1 | 10/2003 | Hillis et al. |
| 2003/0217023 A1 | 11/2003 | Cui et al. |
| 2003/0217335 A1 | 11/2003 | Chung et al. |
| 2004/0024739 A1 | 2/2004 | Copperman et al. |
| 2004/0049522 A1 | 3/2004 | Streepy, Jr. |
| 2005/0010428 A1 | 1/2005 | Bergeron et al. |
| 2005/0065955 A1 | 3/2005 | Babikov et al. |
| 2005/0086188 A1 | 4/2005 | Hillis et al. |
| 2005/0149518 A1 | 7/2005 | Duan et al. |
| 2005/0154708 A1 | 7/2005 | Sun |
| 2005/0209874 A1 | 9/2005 | Rossini |
| 2005/0216335 A1 | 9/2005 | Fikes et al. |
| 2005/0223109 A1 | 10/2005 | Mamou et al. |
| 2005/0289524 A1 | 12/2005 | McGinnes |
| 2006/0010117 A1 | 1/2006 | Bonabeau et al. |
| 2006/0026147 A1 | 2/2006 | Cone et al. |
| 2006/0053172 A1 | 3/2006 | Gardner et al. |
| 2006/0074980 A1 | 4/2006 | Sarkar |
| 2006/0085489 A1 | 4/2006 | Tomic et al. |
| 2006/0129906 A1 | 6/2006 | Wall |
| 2006/0153083 A1 | 7/2006 | Wallenius |
| 2006/0195407 A1 | 8/2006 | Athelogou et al. |
| 2006/0242564 A1 | 10/2006 | Egger et al. |
| 2006/0271520 A1 | 11/2006 | Ragan |
| 2007/0033531 A1 | 2/2007 | Marsh |
| 2007/0036440 A1 | 2/2007 | Schaepe et al. |
| 2007/0038500 A1 | 2/2007 | Hammitt et al. |
| 2007/0061195 A1 | 3/2007 | Liu et al. |
| 2007/0078889 A1 | 4/2007 | Hoskinson |
| 2007/0083492 A1 | 4/2007 | Hohimer et al. |
| 2007/0094221 A1 | 4/2007 | Au |
| 2007/0106658 A1 | 5/2007 | Ferrari et al. |
| 2007/0118542 A1* | 5/2007 | Sweeney ............... 707/100 |
| 2007/0136221 A1 | 6/2007 | Sweeney et al. |
| 2007/0143300 A1 | 6/2007 | Gulli et al. |
| 2007/0174041 A1 | 7/2007 | Yeske |
| 2007/0192272 A1 | 8/2007 | Elfayoumy et al. |
| 2007/0203865 A1 | 8/2007 | Hirsch |
| 2007/0208719 A1 | 9/2007 | Tran |
| 2007/0208764 A1 | 9/2007 | Grisinger |
| 2007/0288503 A1 | 12/2007 | Taylor |
| 2007/0294200 A1 | 12/2007 | Au |
| 2007/0300142 A1 | 12/2007 | King et al. |
| 2008/0001948 A1 | 1/2008 | Hirsch |
| 2008/0004864 A1 | 1/2008 | Gabrilovich et al. |
| 2008/0021925 A1 | 1/2008 | Sweeney |
| 2008/0072145 A1 | 3/2008 | Blanchard et al. |
| 2008/0086465 A1 | 4/2008 | Fontenot et al. |
| 2008/0092044 A1 | 4/2008 | Lewis et al. |
| 2008/0126303 A1 | 5/2008 | Park et al. |
| 2008/0137668 A1 | 6/2008 | Rodriguez et al. |
| 2008/0154906 A1 | 6/2008 | McDavid et al. |
| 2008/0162498 A1 | 7/2008 | Omoigui |
| 2008/0228568 A1 | 9/2008 | Williams et al. |
| 2008/0243480 A1 | 10/2008 | Bartz et al. |
| 2008/0270120 A1 | 10/2008 | Pestian et al. |
| 2008/0275694 A1 | 11/2008 | Varone |
| 2008/0281814 A1 | 11/2008 | Calistri-Yeh et al. |
| 2008/0294584 A1 | 11/2008 | Herz |
| 2009/0012842 A1 | 1/2009 | Srinivasan et al. |
| 2009/0018988 A1 | 1/2009 | Abrams et al. |
| 2009/0024385 A1 | 1/2009 | Hirsch |
| 2009/0024556 A1 | 1/2009 | Hirsch |
| 2009/0028164 A1 | 1/2009 | Hirsch |
| 2009/0055342 A1 | 2/2009 | Gong et al. |

(56) References Cited

U.S. PATENT DOCUMENTS

| | | |
|---|---|---|
| 2009/0070219 A1 | 3/2009 | D'Angelo et al. |
| 2009/0083140 A1 | 3/2009 | Phan |
| 2009/0106234 A1 | 4/2009 | Siedlecki et al. |
| 2009/0138454 A1 | 5/2009 | Rayner et al. |
| 2009/0144059 A1 | 6/2009 | Yu et al. |
| 2009/0150809 A1 | 6/2009 | Hirsch |
| 2009/0157442 A1 | 6/2009 | Tesler |
| 2009/0157616 A1 | 6/2009 | Barber et al. |
| 2009/0182725 A1 | 7/2009 | Govani et al. |
| 2009/0192954 A1 | 7/2009 | Katukuri et al. |
| 2009/0192968 A1 | 7/2009 | Tunstall-Pedoe |
| 2009/0198561 A1 | 8/2009 | Otto et al. |
| 2009/0228425 A1 | 9/2009 | Goraya |
| 2009/0300326 A1 | 12/2009 | Sweeney |
| 2009/0307581 A1 | 12/2009 | Jaepel et al. |
| 2009/0327205 A1 | 12/2009 | Sweeney |
| 2009/0327417 A1 | 12/2009 | Chakra et al. |
| 2010/0030552 A1 | 2/2010 | Chen et al. |
| 2010/0036783 A1 | 2/2010 | Rodriguez |
| 2010/0036790 A1 | 2/2010 | Sweeney et al. |
| 2010/0036829 A1 | 2/2010 | Leyba |
| 2010/0049702 A1 | 2/2010 | Martinez et al. |
| 2010/0049766 A1 | 2/2010 | Sweeney et al. |
| 2010/0057664 A1 | 3/2010 | Sweeney et al. |
| 2010/0070448 A1 | 3/2010 | Omoigui |
| 2010/0100546 A1 | 4/2010 | Kohler |
| 2010/0107094 A1 | 4/2010 | Steelberg et al. |
| 2010/0122151 A1 | 5/2010 | Mendelson et al. |
| 2010/0153219 A1 | 6/2010 | Mei et al. |
| 2010/0161317 A1 | 6/2010 | Au |
| 2010/0198724 A1 | 8/2010 | Thomas |
| 2010/0205061 A1 | 8/2010 | Karmarkar |
| 2010/0217745 A1 | 8/2010 | Song et al. |
| 2010/0223295 A1 | 9/2010 | Stanley et al. |
| 2010/0228693 A1 | 9/2010 | Dawson et al. |
| 2010/0235307 A1 | 9/2010 | Sweeney et al. |
| 2010/0250526 A1 | 9/2010 | Prochazka et al. |
| 2010/0257171 A1 | 10/2010 | Shekhawat |
| 2010/0262456 A1 | 10/2010 | Feng et al. |
| 2010/0268596 A1 | 10/2010 | Wissner et al. |
| 2010/0280860 A1 | 11/2010 | Iskold et al. |
| 2010/0285818 A1 | 11/2010 | Crawford |
| 2010/0287011 A1 | 11/2010 | Muchkaev |
| 2011/0040749 A1 | 2/2011 | Ceri et al. |
| 2011/0060644 A1 | 3/2011 | Sweeney |
| 2011/0060645 A1 | 3/2011 | Sweeney |
| 2011/0060794 A1 | 3/2011 | Sweeney |
| 2011/0113386 A1 | 5/2011 | Sweeney et al. |
| 2011/0173176 A1 | 7/2011 | Christensen et al. |
| 2011/0282919 A1 | 11/2011 | Sweeney et al. |
| 2011/0314006 A1 | 12/2011 | Sweeney et al. |
| 2011/0314382 A1 | 12/2011 | Sweeney |
| 2011/0320396 A1 | 12/2011 | Hunt et al. |
| 2012/0143880 A1 | 6/2012 | Sweeney et al. |
| 2012/0150874 A1 | 6/2012 | Sweeney et al. |
| 2012/0166371 A1 | 6/2012 | Sweeney et al. |
| 2012/0166372 A1 | 6/2012 | Ilyas et al. |
| 2012/0166373 A1 | 6/2012 | Sweeney et al. |

FOREIGN PATENT DOCUMENTS

| | | |
|---|---|---|
| EP | 0 962 873 A1 | 12/1999 |
| JP | 2007-087216 | 5/2007 |
| WO | 02/054292 A2 | 7/2002 |
| WO | 2004/075466 A2 | 9/2004 |
| WO | 2005/020093 A1 | 3/2005 |
| WO | 2005/020094 A1 | 3/2005 |
| WO | 2007/047971 A2 | 4/2007 |
| WO | 2008/025167 A1 | 3/2008 |
| WO | 2008/076438 A1 | 6/2008 |
| WO | 2009/014837 A2 | 1/2009 |
| WO | 2009/132442 A1 | 11/2009 |
| WO | 2010/022505 A | 3/2010 |
| WO | 2010/149427 A1 | 12/2010 |
| WO | 2011/029177 A1 | 3/2011 |
| WO | 2011/029177 A4 | 3/2011 |
| WO | 2011/057396 A1 | 5/2011 |
| WO | 2011/160204 A1 | 12/2011 |
| WO | 2011/160205 A1 | 12/2011 |
| WO | 2011/160214 A1 | 12/2011 |
| WO | 2012/088590 A1 | 7/2012 |
| WO | 2012/088591 A1 | 7/2012 |
| WO | 2012/088611 A1 | 7/2012 |
| WO | 2012/092669 A1 | 7/2012 |

OTHER PUBLICATIONS

Office Action for JP Patent Application No. 2011-524147 mailed on Sep. 10, 2013.
Toshiki Yamaoka et al., "Creation of a Successful Product, Observation Engineering," Kyoritsu Shuppan Co. Ltd., Jun. 15, 2008, $1^{st}$ edition, p. 39.
International Search Report and Written Opinion of the International Searching Authority for International Application No. PCT/CA2009/001185, mailed Dec. 3, 2009.
Chinese Office Action for Chinese Application No. 200780032062.9, Issued May 17, 2011.
International Search Report and Written Opinion for PCT/CA2007/001546 dated Dec. 28, 2007.
International Preliminary Report on Patentability for PCT/CA2007/001546 dated Dec. 19, 2008.
International Search Report and Written Opinion for PCT/CA2009/000567 mailed Aug. 24, 2009.
International Preliminary Report on Patentability for PCT/CA2009/000567 mailed Nov. 11, 2010.
International Search Report and Written Opinion for PCT/CA2009/001185 mailed Dec. 3, 2009.
International Preliminary Report on Patentability for PCT/CA2009/001185 mailed Mar. 10, 2011.
International Search Report and Written Opinion for PCT/CA2010/001382 mailed Jan. 13, 2011.
International Preliminary Report on Patentability for PCT/CA2010/001382 mailed Mar. 22, 2012.
International Search Report and Written Opinion for PCT/CA2010/001772 dated Apr. 28, 2011.
International Preliminary Report on Patentability for PCT/CA2010/001772 dated May 24, 2012.
International Search Report and Written Opinion for PCT/CA2011/000718 mailed Oct. 13, 2011.
International Search Report and Written Opinion for PCT/CA2011/000719 mailed Sep. 28, 2011.
International Search Report and Written Opinion for PCT/CA2011/000745 mailed Sep. 22, 2011.
International Search Report and Written Opinion for PCT/CA2011/001382 mailed Apr. 24, 2012.
International Search Report and Written Opinion for PCT/CA2011/001402, mailed Apr. 24 2012.
International Search Report and Written Opinion for PCT/CA2011/001403 mailed May 23, 2012.
International Search Report and Written Opinion for PCT/CA2012/000007 mailed Apr. 20, 2012.
International Search Report and Written Opinion for PCT/CA2012/000009 mailed May 1, 2012.
Office Action for U.S. Appl. No. 11/625,452 mailed Mar. 30, 2009.
Office Action for U.S. Appl. No. 11/625,452 mailed Dec. 7, 2009.
Office Action for U.S. Appl. No. 11/625,452 mailed Mar. 26, 2010.
Office Action for U.S. Appl. No. 12/477,994 mailed Aug. 31, 2010.
Office Action for U.S. Appl. No. 12/477,977 mailed Sep. 28, 2010.
Office Action for U.S. Appl. No. 11/469,258 mailed Aug. 21, 2008.
Interview Summary for U.S. Appl. No. 11/469,258 mailed Dec. 16, 2008.
Office Action for U.S. Appl. No. 11/550,457 mailed Dec. 15, 2008.
Office Action for U.S. Appl. No. 12/556,349 mailed Jun. 29, 2010.
Office Action for U.S. Appl. No. 12/441,100 mailed Jun. 9, 2011.
Office Action for U.S. Appl. No. 12/441,100 mailed Jan. 24, 2012.
Advisory Action for U.S. Appl. No. 12/441,100 mailed May 4, 2012.
Office Action for U.S. Appl. No. 12/549,812 mailed Oct. 1, 2012.
Office Action for U.S. Appl. No. 12/555,222 nailed Jan. 27, 2012.

(56) References Cited

OTHER PUBLICATIONS

Office Action for U.S. Appl. No. 12/555,222 mailed Oct. 31, 2012.
Office Action for U.S. Appl. No. 12/555,341 mailed Feb. 9, 2012.
Office Action for U.S. Appl. No. 12/555,341 mailed Aug. 1, 2012.
Office Action for U.S. Appl. No. 12/615,703 mailed Feb. 1, 2012.
Office Action for U.S. Appl. No. 13/105,890 mailed Jun. 26, 2012.
[No Author Listed] "Faceted Classification and Adaptive Concept Matching," Gemstone Business Intelligence Ltd., Feb. 2006. pp. 1-7. 7 pages.
Anick et al., Interactive document retrieval using faceted terminological feedback. HICSS-32. Proceedings of the 32nd Annual Hawaii International Conference on Systems Sciences. 1999;2(2):2036-2048. Digital Object Identifier: 10.1109/HICSS.1999.772692.
Blei et al., Hierarchical bayesian models for applications in information retrieval. In: Bayesian Statistics 7. Bernardo et al., eds. 2003:25-43.
Bollegala et al., Measuring semantic similarity between words using web searches engines. Proceedings of 16th International Conference on World Wide Web. 2007;757-66.
Brewster et al., User-Centered Ontology Learning for Knowledge Management. 7th International Workshop on Applications of Natural Language to Information Systems, Stockholm, Jun. 27-28, 2002. Lecture Notes in Computer Sciences, Springer Verlag. 2002:12 pages.
Brewster et al., User-Centered Ontology Learning for Knowledge Management. 7th International Workshop on Applications of Natural Language to Information Systems, Stockholm, Jun. 27-28, 2002. Lecture Notes in Computer Sciences, Springer Verlag. 2002:203-207. 5 pages.
Dakka et al., Automatic Extraction of Useful Facet Hierarchies from Text Databases. Data Engineering. IEEE 24th International Conference on Apr. 7-12, 2008. ICDE 2008:466-475. Digital Object Identifier 10.1109/ICDE.2008.4467455.
Fikadu et al., A Framework for Personalized Information Retrieval Model. Conference Proceedings, Second International Conference on Computer and Network Technology (ICCNT), IEEE, Piscataway, NJ, USA Apr. 23, 2010, pp. 500-505.
Gabrilovich et al., Computing semantic relatedness using wikipedia-based explicit semantic analysis. Proceedings of 20th International Joint Conference on Artificial Intelligence. 2007;1606-11.
Hassan-Montero et al., Improving tag-clouds as visual information retrieval interfaces, International Conference on Multidisciplinary Information Sciences and Technologies, InSciT2006. Oct. 25-28, 2006, Merida, Spain. 6 pages.
Hiemstra, A probabilisitc justification for using tf-idf temp weighting in information retrieval. International Journal on Digital Libraries. 2000;3(2):131-39.
Jiang et al., Semantic similarity based on corpus statistics and lexical taxonomy. Proceedings of International Conference Research on Computational Linguisties. 1997; 15 pages.
Jones, A statistical interpretation of term specificity and its applications in retrieval. Journal of Documentation. 2004;60(5):493-502.
Kaser et al., Tag-Cloud Drawing: Algorithms for Cloud Visualization, arXiv:cs/0703109v2 [cs.DS] May 7, 2007.
Lewis, Naive (bayes) at forty: The independence assumption in information retrieval. Lecture Notes in Computer Science. 1998-1398:4-15.
Ma et al., Semantic Information Extraction of Video Based on Ontology and Inference. ICSC 2007. International Conference on Semantic Computing. 2007;1:721-726. Digital Object Identifier: 10.1109/ICSC.2007.12.
Metzler et al., A markov random field model for term dependencies. Proceedings of SIGIR 2005. 2005:472-79.
Ozcan et al., Concept-based information access. Proceedings of the International Conference on Information Technology: Coding and Computing. ITCC 2005;1:794-799. Digital Object Identifier: 10.1109/ITCC.2005.111.
Payne et al., Calendar Agents on the Semantic Web. IEEE Intelligent Systems. Jun. 2002;17(3):84-86.
Robertson, Understanding inverse document frequency: On theoretical arguments for ids. Journal of Documentation. 2004;60(5):503-20.
Rocha, Adaptive Webs for Heterarchies with Diverse Communities of Users. Paper prepared for the workshop from Intelligent Networks to the Global Brain: Evolutionary Social Organization through Knowledge Technology, Brussels Jul. 3-5, 2001. LAUR005173. 35 pages.
Seco et al., An intrinsic information content metric for semantic similarity in wordnet. Proceedings of 16th European Conference on Artifical Intelligence. 2004;1089-90.
Slavic et al., Core Requirements for Automation of Analytico-Synthetic Classifications. Advances in Knowledge Organization. 2004;9:187-192.
Song et al., A conceptual graph approach to semantic similarity computation method for e-service discovery. International Journal on Knowledge Engineering and Data Mining. 2010;1(1):50-68.
Storey, Comparing Relationships in Conceptual Modeling: Mapping to Semantic Classifications. IEEE Transactions on Knowledge and Data Engineering. 2005;17(11):1478-1489. Digital Object Identifier: 10.1109.
Terra et al., Frequency estimates for statistical word similarity measures. Proceedings of 2003 Conference of the North American Chapter of the Association for Computational Linguistics on Human Language Technology. 2003:165-172.
Wang et al., Gene expression correlation and gene ontology-based similarity: An assessment of quantitative relationships. Proceedings of IEEE Symposium on Computational Intelligence in Bioinformatics and Computational Biology, 2004:25-31.
Wu et al., Interpreting tf-idf term weights as making relevance decisions. ACM Transactions on Information Systems. 2008;26(3): Article No. 13.
Zhai, Statistical language models for information retrieval—a critical review. Foundations and Trends in Information Retrieval. 2008;2(3):137-213.
Zhang et al., Bootstrapping Ontology Learning for Information Retrieval Using Formal Concept Analysis and Information Anchors. 14$^{th}$ International Conference on Conceptual Structures. Aalborg, Denmark. Jul. 2006. 14 pages.

* cited by examiner

SYSTEMS AND METHODS FOR SEMANTIC CONCEPT DEFINITION AND SEMANTIC CONCEPT RELATIONSHIP SYNTHESIS UTILIZING EXISTING DOMAIN DEFINITIONS

CROSS REFERENCE TO RELATED APPLICATIONS

This application is a continuation of U.S. patent application Ser. No. 12/549,812, entitled "Systems And Methods For Semantic Concept Definition And Semantic Concept Relationship Synthesis Utilizing Existing Domain Definitions" and filed on Aug. 28, 2009, which is incorporated herein by reference in its entirety. U.S. patent application Ser. No. 12/549,812 claims, under 35 U.S.C. §119(e), priority to and the benefit of the filing date of, U.S. provisional application Ser. No. 61/092,973, filed on Aug. 29, 2008, and titled, "Semantic Concept Definition And Semantic Concept Relationship Synthesis Utilizing Existing Domain Definitions." The provisional application is incorporated by reference herein in its entirety.

FIELD OF THE INVENTION

Embodiments of the invention relate to a computer system and computer-implemented method for processing natural language textual data to provide therefrom concept definitions and concept relationship synthesis using a semantic processing protocol in support of building semantic graphs and networks.

BACKGROUND OF THE INVENTION

A semantic network is a directed graph consisting of vertices, which represent concepts, and edges which represent semantic relationships between concepts. Semantic networking is a process of developing these graphs. A key part of developing semantic graphs is the provision of concept definitions and concept relationships. The present invention addresses this issue.

A semantic network can, in essence, be viewed as a knowledge representation. A knowledge representation is a way to model and store knowledge so that a computer-implemented program may process and use it. In the present context, specifically, knowledge representation may be viewed as a rule-based modeling of natural language from a computational perspective. The substantive value of a knowledge representation is accumulative in nature and as such increases with the amount of knowledge that can be captured and encoded by a computerized facility within a particular model.

One problem associated with an unbounded knowledge representation, is that current systems may impose significant barriers to scale. This is one reason why knowledge representations are often very difficult to prepare. Further, their technical complexity and precision may impose intellectual and time constraints that limit their generation and use. Further, existing systems are generally directed to the analysis and retrieval of knowledge representation from existing forms such as documents and unstructured text. With these analysis and retrieval systems, the amount of knowledge extracted is necessarily limited to the amount of knowledge that was captured in the existing forms. They may not include all the potential for new knowledge that may be derivable from these documents.

As an example of these problems, consider the following application, typical of the current approach: A product support knowledge base comprising a collection of documents is made available to customers to address their questions about one or more products. The documents are annotated by the publisher with semantic data to describe in minute, machine-readable detail the subject matter of the documents. These documents are then made available through a search tool to provide the customers with the documents most relevant to their queries.

The problem with this application is that the breadth of knowledge encapsulated by the system is bounded by the documents contained within the knowledge base (as expressed through the explicit semantic representations of concept definitions and relationships). People, however, are able to create new knowledge that is inspired by the documents that they read. Continuing the example above, as customers read documents that are related to their needs, they are able to extrapolate from this existing knowledge into the very precise solutions they seek to their problems, creating new knowledge in the process. Unfortunately, there does not yet exist a technical solution that mirrors in a computer-implemented system this process of conceptual extrapolation. The publishers can only describe the knowledge they possess; they cannot provide a system of knowledge representation that encapsulates all the knowledge that might be required, or deduced, by their customers.

Therefore, great significance and associated business value for provisioning new concepts and concept relationships lies in pushing through these barriers to automate the scaling and proliferation of knowledge representations into brand new application areas. One way to distinguish between existing and new applications is that whereas existing applications might answer, "What knowledge is contained in these documents?", new applications might answer, "What knowledge can we generate next?" Among the technical barriers to achieving such knowledge creation applications is the provisioning of new mechanisms to define and capture concepts and concept relationships.

SUMMARY

There are various aspects to the systems and methods disclosed herein. Unless it is indicated to the contrary, these aspects are not intended to be mutually exclusive, but can be combined in various ways that are either discussed herein or will be apparent to those skilled in the art. Various embodiments, therefore, are shown and still other embodiments naturally will follow to those skilled in the art. An embodiment may instantiate one or more aspects of the invention. Embodiments, like aspects, are not intended to be mutually exclave unless the context indicates otherwise.

One aspect of the inventive concepts is a computer-implemented method to synthesize concept definitions and relationships, such as from a natural language data source, that comprises obtaining an active concept definition, matching the active concept definition to a plurality of extracted real concept definitions within a domain, analyzing the real concept definitions for coherence within their attributes and deriving a plurality of virtual concept definitions from the real concept definitions by semantic processing, such that the derived virtual concept definitions form a hierarchical structure.

Another aspect is a computer-implemented method to synthesize concept definitions and relationships, that comprises obtaining an active concept definition, matching the active concept definition to a plurality of extracted real concept definitions comprising attributes within a domain, analyzing the real concept definitions for coherence within their attributes and deriving a plurality of virtual concept definitions from the real concept definitions by semantic processing, such that the derived virtual concept definitions form a hierarchical structure.

Yet another aspect is a machine-readable medium containing executable computer-program instructions which, when executed by a data processing system causes said system to perform a method, the method comprising obtaining an active concept definition, matching the said active concept definition to a plural number of extracted real concept definitions comprising of attributes within a domain, the said real concept definitions analyzed for coherence within their attributes and deriving a plural number of virtual concept definitions from the real concept definitions by semantic processing such that, the derived virtual concept definitions form a hierarchical structure.

Further aspects include computer systems for practicing such methods. For example, an additional aspect is a semantic data processing computer system comprising: at least one tangible memory that stores processor-executable instructions for synthesizing concept definitions and relationships; and at least one hardware processor, coupled to the at least one tangible memory, that executes the processor-executable instructions to: obtain an active concept definition; extract a plural number of real concept definitions that comprise of attributes from a domain and analyze them for coherence within their attributes; match the said active concept definition to the extracted real concept definitions; and derive a plurality of virtual concept definitions from the real concept definitions semantic processing such that the derived virtual concept definitions form a hierarchical structure.

DETAILED DESCRIPTION OF THE INVENTION

Figure 1:
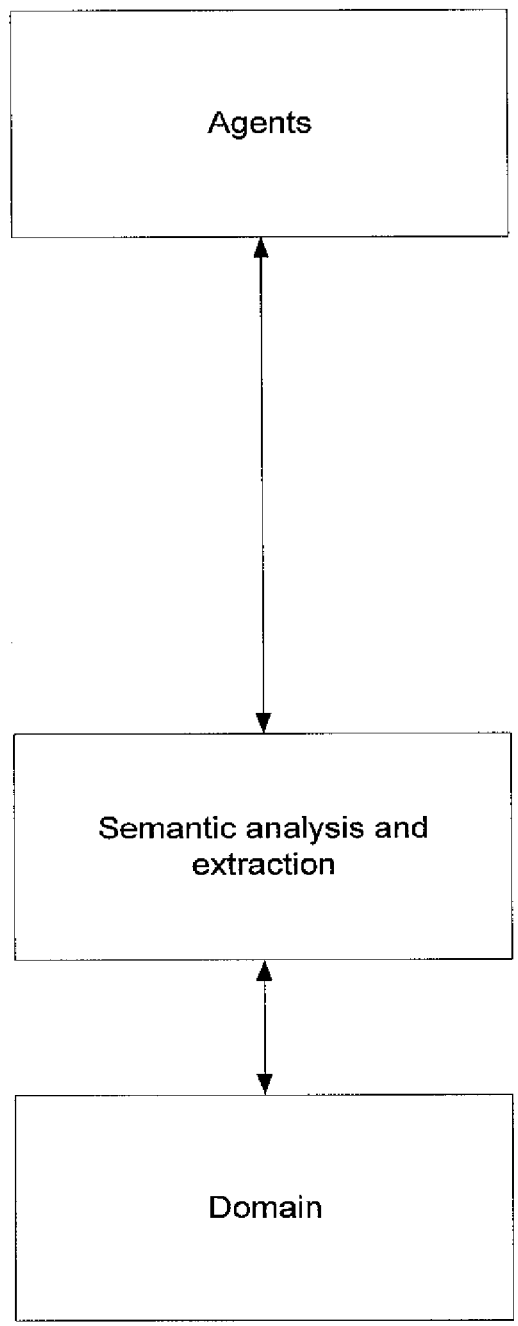
FIG. 1 illustrates the prior art status.

Visual Basic and Windows are registered trademarks of Microsoft Corporation in the United States and other countries. Linux® is the registered trademark of Linus Torvalds in the U.S. and other countries.

There are disclosed herein a method, system and computer program providing means for provisioning concept definition and concept relationship synthesis. These aspects of the invention capitalize on the properties of tree structures and a semantic representation that models the intrinsic definition of a concept. As such, new concepts and concept relationships may be created in a way that is not constrained by any historical or existing knowledge representation. Thus, some embodiments of the present invention provide for a new, creative and user-directed expression of semantic representation and networking (graphs). This results in an ability to synthesize forward-looking knowledge, not merely the extraction of historical knowledge.

A practical utility of this approach may comprise a whole or part of a brainstorming session, developing insights by uncovering new concepts from existing knowledge in the aid of creative writing, carving of journalistic research from a huge corpus of text documents, and in general any directed research or study which may involve developing new insights from a given corpus of text-based linguistic data. Embodiments of the inventions generate, from a domain of data, virtual concept definitions and relationships between virtual concept definitions (e.g., a hierarchy of virtual concept definitions). In some embodiments, the virtual concept definitions and their relationships may be provided to a user to aid in the activities discussed above. In other embodiments, the virtual concept definitions and their relationships may be provided to document processing/generation software which uses these definitions to aid in the automatic generation of document or to facilitate manual generation of such documents.

In some embodiments, an active concept is entered or acquired by a cognitive (e.g., human and/or software) agent and relevant real concept definitions are extracted from data representing a particular knowledge domain. The extracted definitions are computer-analyzed for their attribute set coherence within the context of the active concept definition. Attribute sets are then selected from the extracted real concept definitions and a concept synthesis process derives virtual concept definitions based upon selected attribute sets. These derived virtual concept definitions are then assembled into hierarchies. The remaining extracted real concept definitions are then computer-analyzed against the derived virtual concept definition hierarchy and if any further virtual concept definitions can be derived, then the process is repeated. The semantic protocols exemplified in the context of the present invention are formal concept analysis and faceted classification synthesis. In addition, various overlays that affect selection of attributes such as attribute co-occurrence and relative proximity are incorporated. Further, various numerically oriented limitations in the derivations of virtual concepts are also incorporated.

One way to provide for concept definitions and concept relationships is by extraction of concept definitions from existing documents. However, this may be limited by what is already encoded in the documents and it does not provide for new concept synthesis. As such, extracted semantic representations may act only as a basis for a subsequent process of data transformation that produces a synthesis of new concept definitions and new concept relationships.

Extraction of concepts may be understood, for example, with reference to U.S. patent application Ser. No. 11/540,628 (Pub. No. US 2007-0078889 A1), which is hereby incorporated by reference in its entirety. In that application, Hoskinson provides for extraction of concepts from existing documents. An information extraction facility extracts text and then extracts keywords from captured text. The keywords are extracted by splitting text into a word array using various punctuation marks and space characters as separators of words, such that each element in the array is a word Subsequently, the process generates a keyword index from the word array by removing all words in the word array that are numeric, are less than two characters, or are stopwords (e.g., and, an, the an, etc). All the remaining words are included in the keyword index. Once the keyword index is generated, words in the keyword index that occur at least a threshold number of times are retained in the index, while words that occur less than the threshold hold number of times are removed from the index. The keyword index may be further identify key phrases in the text. These key phrases may be viewed as equivalent to the concepts referred to in the present disclosure. Sets of key phrases associated with keywords that provide a context for the key phrases may be viewed as equivalent to the existing concept definitions referred to in the present disclosure.

Hoskinson describes identifying key phrases using the keyword index and document text as follows. First, the document text is analyzed and punctuation symbols that are associated with phrase boundaries are replaced with a tilde character. Next, a character array is generated by parsing the document into strings that are separated by space characters. Each element in the array is either a word or a phrase boundary character (i.e., a tilde character). Next, the process enumerates through the character array, and determines whether each element is a keyword that appears in the keyword index. If an element is not a keyword, it is replaced with a phrase boundary (i.e., tilde) character. The array elements are then concatenated into a character string, where each character string is delineated by the phrase boundary. It is then determined if each character string is a single word or a phrase. If it is a phrase, it is considered to be a keyphrase, and is added to the keyphrase dictionary.

It should be appreciated that the above-described technique for extracting concepts from documents is one illustrative technique for concept extraction. Many other techniques may be used and the invention is not limited to using this or any other particular technique.

Figure 2:
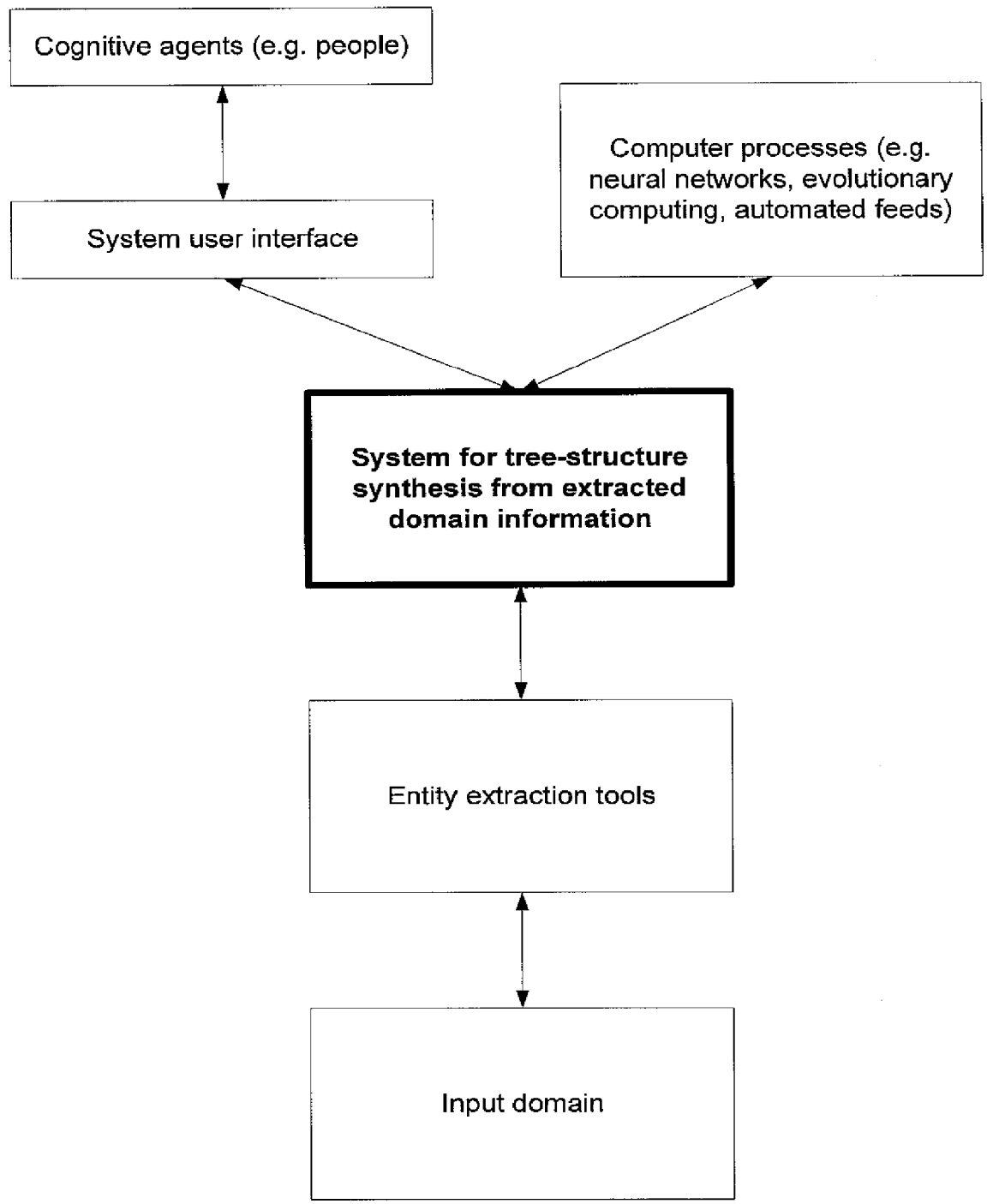
FIG. 2 illustrates incorporation and insertion of tree structure synthesis within the prior art schema, in accordance with some embodiments of the invention.

Further, existing concept definitions that are extracted from a domain or corpus of data may be used as a measure of coherence of various attributes sets (combinations of different attributes). Inputs that are active concepts are entered by cognitive agents such as people or machine based expert systems and processed through data analysis or a semantic processing protocol in order to procure existing concepts and relationships covering the context of the active concept within a domain. The existing concepts, also known as real concept definitions, provide a basis to build virtual concepts and their subsequent relationships around the active concept. FIG. 1 represents the prior art approach, wherein a cognitive or input agent interacts with a domain date set via semantic analysis and extraction. In contrast, the at least some of the processes disclosed herein envisage, as shown in FIG. 2, the interaction of a cognitive agent (such as a person) or an input agent via a user interface through extraction of existing domain resources and the use of tree-structure synthesis to construct new concept definitions based upon existing definitions within a domain of data. The input or cognitive agent could further be computer processes like neural networks or evolutionary computing techniques. A tree-structure synthesis creates graphs of concepts and concept relationships that may be limited to a particular context.

One semantic processing protocol that may be utilizable to implement tree-structure synthesis is formal concept analysis. Formal concept analysis may be viewed as a principled way of automatically deriving a formal representation of a set of concepts within a domain and the relationships between those concepts from a collection of objects and their properties (attributes). Other semantic processing protocols that may be used to implement tree-structure synthesis are formal concept analysis, faceted classification synthesis, and concept inferencing using semantic reasoners. All these approaches are available in the prior art.

EXPLANATION OF KEY TERMS

Domain: A domain is body of information, such as (but not limited to) a corpus of documents, a website or a database.

Attribute: A property of an object.

Attribute set coherence: Attribute set coherence is a measure of the logical coherence of concept attributes when considered as a set within a concept definition structure.

Content Node Comprises of any object that is amenable to classification, such as a file, a document, a portion of a document, an image, or a stored string of characters.

Hierarchy: An arrangement of broader and narrower terms. Broader terms may be viewed as objects and narrower terms as attributes.

Tree Structures Trees are like hierarchies comprising directed classes and subclasses, but using only a subset of attributes to narrow the perspective. An organizational chart can be seen as an example of a tree structure. The hierarchical relationships are only valid from perspective of job roles or responsibilities. If the full attributes of each individual were considered, no one would be related hierarchically.

Concept Definition Semantic representations of concepts defined structurally in a machine-readable form are known as concept definitions. One such representation structures concepts in terms of other more fundamental entities such as concept attributes. A concept definition has its own hierarchy, with a concept as parent and attributes as children. Attributes may in turn be treated as concepts, with their own sets of attributes. Concepts may be associated with specific content nodes.

Concept Synthesis: Concept synthesis is the creation of new (virtual) concepts and relationships between concepts.

Confidence Gradient The gradient refers to an ordered range of values while confidence may be referred to as a metric used in algorithms to assess the probability that one set of attributes is more coherent than others. So the composition "confidence gradient" might refer to a declining or elevating confidence level within a group of attribute sets as well as an ordered increase or decrease of the confidence metric within an attribute set with the count of each single attribute starting from general to specific. The confidence may be calibrated using a number of properties of attributes. Two frequently used ones are relative proximity between selected attributes and co-occurrence of two attributes in a set of concept definitions. Another possible measure of confidence would involve overlaying of relative proximity over co-occurrence.

Faceted Classification Synthesis: Faceted classification synthesis allows a concept to be defined using attributes from different classes or facets. Faceted classification incorporates the principle that information has a multi-dimensional quality and can be classified in many different ways. Subjects of an informational domain may be subdivided into facets to represent this dimensionality. The attributes of the domain are related in facet hierarchies. The materials within the domain are then identified and classified based on these attributes. The "synthesis" in faceted classification synthesis refers to the assignment of attributes to objects to define real concepts.

According to one aspect of the disclosed systems and methods, there is shown a synthesis of concepts and hierarchical relationships between concepts, using relevant real (existing) concept definitions within a domain by deriving virtual concept definitions from the existing relevant real concept definitions. The act of deriving a virtual concept definition may be performed utilizing a number of semantic processing protocols that are known in the prior art, such as FCA and faceted classification synthesis, or that may subsequently become known.

Figure 3:
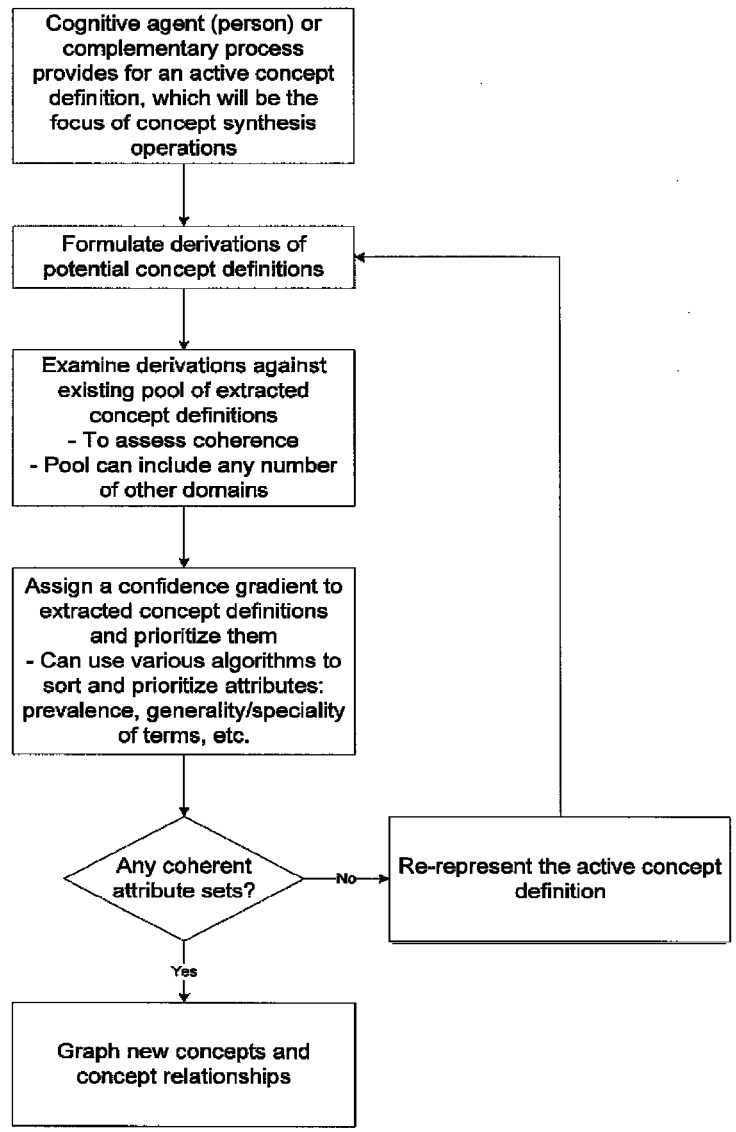
FIG. 3 gives a flow diagram of the process for identifying new concepts and concept relationships, in accordance with some embodiments.
Figure 4:
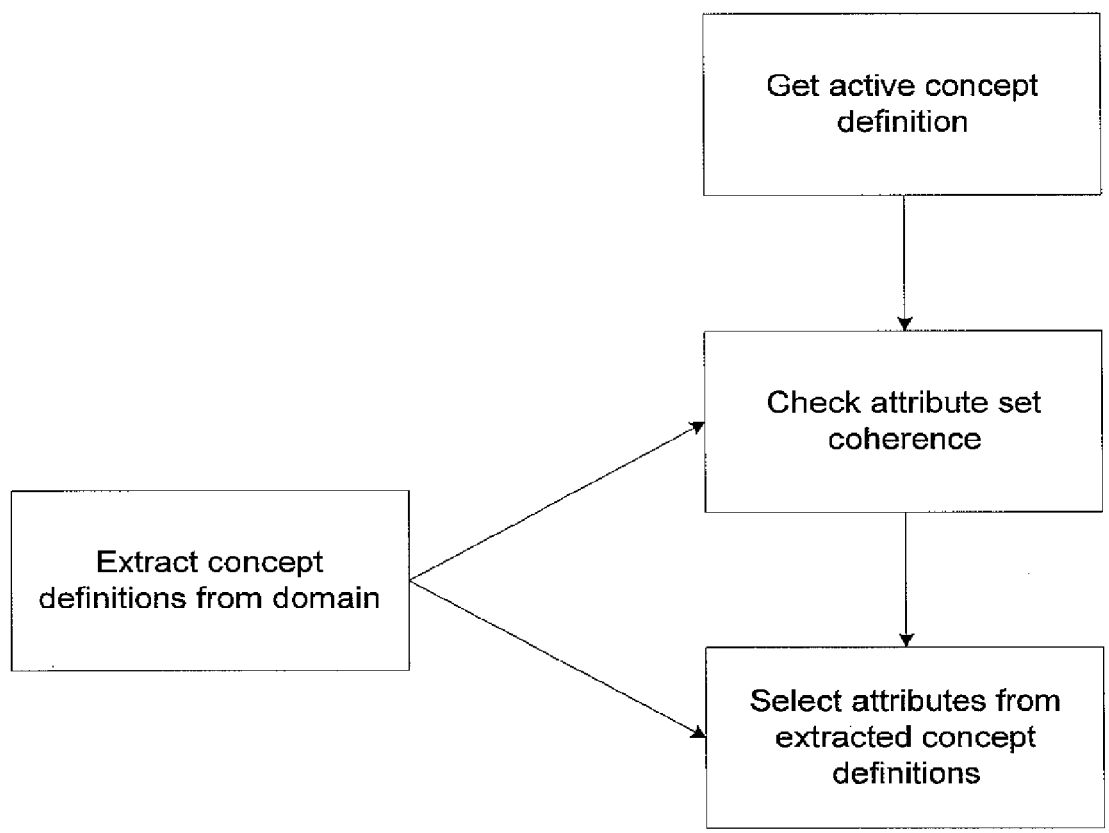
FIG. 4 gives a flow diagram of the staging and analysis phase in accordance with some embodiments of the invention.

With reference to FIG. 3 and FIG. 4, an active concept (AC) is entered or acquired from a cognitive agent and relevant real concept definitions are extracted from a domain. The extracted definitions are analyzed for their attribute-set coherence within the context of the AC definition. Attribute sets are selected from the extracted real concept definitions and a concept synthesis process derives virtual concept definitions based upon selected attribute sets. These derived virtual concept definitions are then assembled into hierarchies. The remaining extracted real concept definitions are then analyzed against the derived virtual concept definition hierarchy and if any can be utilized to construct further virtual concept definitions then the process is repeated again. It is of note that the initial part the overall tree synthesis process, given by FIG. 3, can be seen as a staging and analysis phase given by FIG. 4. The synthesis phase of the overall process can be seen as comprising, for example, the process of FIG. 5.

Figure 5:
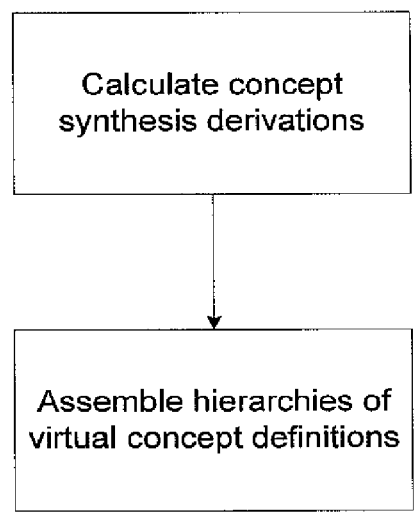
FIG. 5 gives a flow diagram of the synthesis phase in accordance with some embodiments of the invention.
Figure 7:
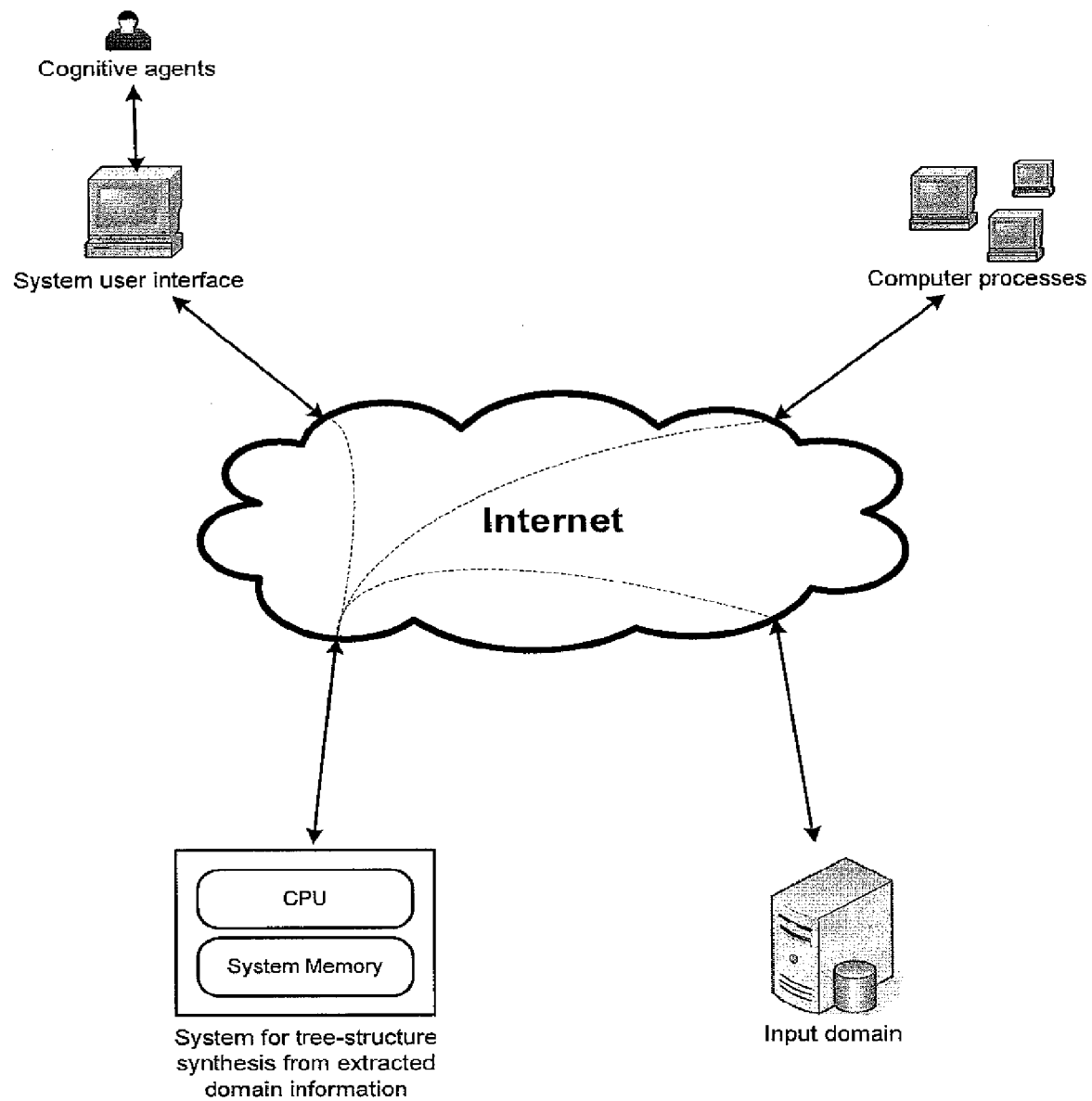
FIG. 7 is a diagram of a computer system in which some embodiments of the invention may be implemented.

FIG. 7 is a diagram of a computer system on which the processes shown in FIGS. 3-5 may be implemented. In FIG. 7, a system for tree-structure synthesis from extracted domain information may receive input information from an input domain and may receive an input active concept definition from a cognitive agent (e.g., a human user) via a system user interface and/or external computer processes. The system for tree-structure synthesis from extracted domain information comprises at least one hardware processor (e.g., a central processing unit (CPU) coupled to at least one tangible storage memory. The system may also comprise an input/output interface (not shown) for receiving the information from the input domain and the cognitive agent(s)/computer processes. Once the cognitive agent and/or computer processes have provided the active concept definition to the system for tree-structure synthesis, the system for tree structure synthesis may perform the remainder of the steps in the example process of FIGS. 3-5.

Formal Concept Analysis

In a further aspect, a way to derive virtual concept definitions in response to an input of an active concept is by formal concept analysis (FCA). If we have real concept definitions $R\alpha$ and $R\beta$, with sets of attributes ordered in a confidence gradient which provides a measure of the coherence of the attributes within the concept definitions, given as follows:
$R\alpha=\{K1, K3, K2\}$
$R\beta=\{K1, K3\}$,
then we have a hierarchy $R\beta \rightarrow R\alpha$. Comparably, with real concept definitions sets $R\gamma$ and $R\delta$, where
$R\gamma=\{K1, K2, K3, K4\}$
and
$R\delta=\{K1, K3, K5, K6\}$
there is no hierarchy between these concepts. In order to construct a hierarchy out of $R\gamma$ and $R\delta$ it is necessary to derive virtual Concept Definitions out of $R\gamma$ and $R\delta$ using FCA such that the criteria for a hierarchical relationship are satisfied.
So we begin with an input, from an input agent or a cognitive agent, of an AC represented by
$R=\{K1\}$.
Identifying R, existing real concept definitions $R\gamma$ and $R\delta$ are extracted such that they may have a confidence gradient that ensures integrity, where $R\gamma$ and $R\delta$ are represented by
$R\gamma=\{K1, K2, K3, K4\}$
and
$R\delta=\{K1, K3, K5, K6\}$.
Since attributes are occurring within a concept definition containing an active concept, it is assumed that the active concept and other attributes within a virtual concept definition have a contextual relationship with each other, such that the more an attribute co-occurs with an active concept across different concept definitions, the more stronger the said contextual relation. If it is possible to build a virtual concept definition set $V\gamma$ with formal concept analysis, such that $V\gamma$ has a built-in confidence gradient that may be based upon prevalence of attributes, where
$V\gamma=\{K1, K3\}$;
and if similarly it is possible to build $V\delta$, such that
$V\delta=\{K1, K3, K4\}$,
then two virtual concept definitions, $V\gamma$ and $V\delta$, have been created that are in a hierarchical relationship between themselves, $V\gamma \rightarrow V\delta$, while each individually is in a relationship at the attribute level by virtue of sharing attributes with real concept definition sets $R\gamma$ and $R\delta$.

Example of Formal Concept Analysis Building a Virtual Concept Definition with a Built-in Confidence Gradient Domain Input: (computers, laptop, desktop, servers, software, operating system, software application, CPU, calculators, algorithm, computer language, user interface, machine language)

Let us say that the domain includes the following real concept definitions with their composite attributes such that they have built-in confidence gradient:
R1: {computers, CPU, laptop, desktop, software, calculator}
R2: {computers, servers, software, operating system, software application, algorithm, computer language}
R3: {computers, machine language, software, algorithm}
R4: {software, user interface, software application}
AC={software}
What is concurrent with the attribute "software"?
computers: 3 times
Algorithm: 2 times
software application: 2 times
laptop: 1 time
desktop: 1 times
servers: 1 time
operating system: 1 time
machine language: 1 time
user interface: 1 time
CPU: 1 time
calculator: 1 time
computer language: 1 time
Counting to find which attribute is concurrent the greatest number of times with the attribute "software", one finds that "computers" is the most prevalent attribute that co-occurs with "software". Thus, V1: {software, computers} is created. Now the tree looks like the following:

```
AC: {software}
|
+-V1: {software, computers}
|
+-V2: {software, software application}
|
+-V3: {software, algorithm}
```

Continuing, recursively, one may determine what is concurrent with "software" and "computers" within the real concept definitions. In this, one finds the following:
Laptop: 1
desktop: 1
servers: 1
operating system: 1
software application: 1
CPU: 1 calculator: 1
algorithm: 2
computer language: 1
machine language: 1
So there is now the following tree:

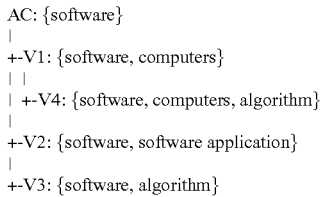

```
AC: {software}
|
+-V1: {software, computers}
| |
| +-V4: {software, computers, algorithm}
|
+-V2: {software, software application}
|
+-V3: {software, algorithm}
```

In the result, V1 and V4 are in a hierarchy and are derived from R1, R2, R3 and R4. For a larger number of real concept definitions with additional attributes it is possible to unfold more hierarchal structures and relationships. If, for a given active concept, the system does not return a sufficient number of real concept definitions in order to derive virtual concept definitions, any number of domains can be searched to achieve the objective. The sufficient number may be considered as a minimum number of domains required to produce at least a selectable depth of one hierarchy within derived virtual concepts or may, additionally, require producing at least a selectable number of hierarchies of derivable virtual concept definitions from a domain. Further, a selectable maximum depth of a hierarchy and a selectable maximum number of hierarchies derived may cap the synthesis process.

Overlaying an additional criterion, namely relative proximity, as a confidence measure in order to build virtual concept definitions can change the virtual concepts derived from the real concept definitions using formal concept analysis. Relative proximity may be referred to as the physical separation of one attribute from another within an attribute set of a concept definition. In the example above, within R2, the attribute "software" is one attribute away from 'computers' and "software application", whereas "software" is two attributes away from "algorithm". In R3, however, "software" is adjacent to "algorithm" or zero attributes away from "algorithm". So one can consider zero as the default relative proximity for "software" and "algorithm" from the existing domain information. If more weight were given to relative proximity and relative proximity were overlaid on the above example, then the virtual concept with a higher confidence measure would come first in the tree. For example, the V1 in this case would be:
V1: {software, algorithm}
because "software" is zero attributes away from "algorithm" while "software" is one attribute away from "computers", so "algorithm" will take precedence over "computers" even though "computers" is co-occurring three times with "software". As such, all virtual concepts will change if the weight of relative proximity shifts the focus from one attribute to another with a higher relative proximity. Further, if between attributes the relative separation is equal, a higher concurrency value will give a higher confidence measure to a derived virtual concept definition. The logic behind giving more weight to relative proximity than concurrency is that relative proximity is directly observable from an existing real concept definition which is a graduated set in terms of coherence within concept definitions.

The sets R1 through R4 in the above example are associated sets. If the real concept definitions are disjoint sets, that is, if none of the attributes of the real concept definitions overlap, then the data transformation is as follows:
Let the disjoint real concept definitions sets be:
R5: {1, 2, 3, 4, 5}
R6: {6, 7, 8, 9, 10}
If the Active Concept is:
AC: {2, 8}
then, applying formal concept analysis to derive virtual concept definitions would give us the following {2, 1}, {2, 3}, {2, 4}, {2, 5}, {8, 6}, {8, 7}, {8, 9} and {8, 10}. Further, overlaying relative proximity would shorten the list to {2, 1}, {2, 3}, {8, 7} and {8, 9}. The disassociated real concept definitions give rise to separate legs (or lineages) of virtual concept definitions each representing the related part of the active concept in question. The analysis iterates over the number of times required to exhaust the list of attributes within the real concept definitions. The derivation of virtual concept definitions is bounded by the confidence as measured by concurrency and relative proximity as detailed above. It is also of note that one can tune these weighting measures in order to achieve the desired scope of a result, that is, to change relative proximity measures to expand or contract the resulting volume of virtual concept definitions.

Faceted Classification Synthesis

Figure 6:
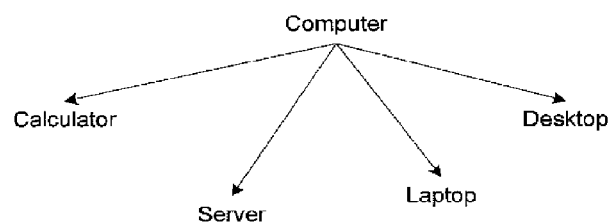
FIG. 6 gives the facet attribute hierarchy for the example where the faceted classification synthesis protocol is implemented.
Figure 6:
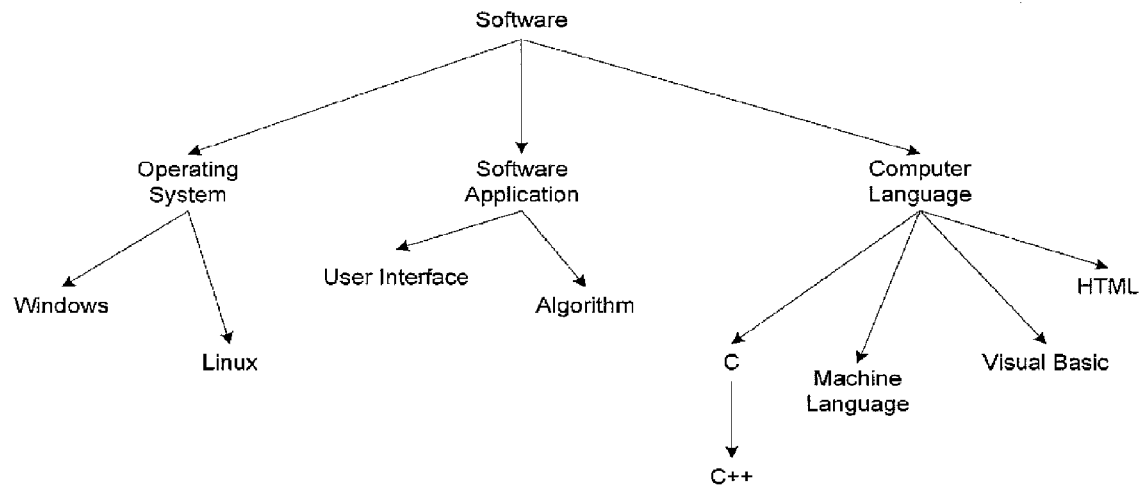

In a further aspect of this disclosure, a way to derive virtual concept definitions in response to an input of an active concept may be implemented by using faceted classification synthesis (FCS) which is based on a structure of facets and attributes that exists within a domain. FIG. 6 is a good example.

Domain Input: (computer, laptop, desktop, servers, software, Windows®, Linux®, operating system, software application, CPU, calculator, algorithm, computer language, user interface, machine language, C, Visual Basic®, C++, HTML)
In this example the domain includes the following facets, built by FCS, with their composite attributes such that they have built-in confidence gradient as followed by the classification structure.
F11: {computer, servers}
F12: {computer, calculator}
F13: {computer, laptop}
F14: {computer, desktop}
F211: {software, operating system, Windows}
F212: {software, operating system, Linux}
F221: {software, software application, user interface}
F222: {software, software application, algorithm}
F2311: {software, computer language, C, C++}
F232: {software, computer language, machine language}
F233: {software, computer language, Visual Basic}
F234: {software, computer language, HTML}

All the facet attribute sets and the number indices (for example F233) listed above in the current example refer to a unique path within the facet attribute hierarchies, with any attribute inheriting all the prior attributes above it. The unique path refers to the index path with reference to FIG. 6. The index 1 at first position from left refers to computers while index 2 in the first position refers to software. Moving on, the next index number refers to inherited attribute one level below and the third index number refers to the attribute further below. The index path ensures only one path for an attribute entry in FIG. 6. Let real concept definitions based upon the facet attribute sets be the following:
IBM PC: {desktop, Windows}
ThinkPad: {laptop, Linux}
Webpage: {servers, HTML, UI}
Browser: {desktop, operating system, software application, computer language}

Web calculator: {server, HTML, software application}
Calculation: {calculator, machine language}
If an active concept is entered as following:
AC: {operating system, computer language}
then virtual concept definitions may be derived from the given real concepts using faceted classification synthesis inheritance bounds and overlaying with relative proximity (with zero and one separation). In deriving the virtual concept definitions, faceted classification synthesis rules allow the substitution of a parent attribute with a child within an attribute hierarchy. The implementation of these faceted classification synthesis substitution rules can be made optional in performing the synthesis. The substitution rule is applied in the example below. The results are as follows:

V1: {operating system, software application, computer language}
V2: {software application, computer language}
V3: {software application, HTML}
V4: {software application, C}
V5: {software application, C±+}
V6: {software application, Visual Basic}
V7: {desktop, operating system, software application}
V8: {desktop, operating system, software application, computer language}
V9: {server, HTML}
V10: {server, HTML, software application}
V11: {server, HTML, UI}
V12: {desktop, Windows}
V13: {laptop, Linux}
V14: {desktop, Linux}
V15: {laptop, Windows}
V16: {calculator, machine language}

In the outcome, it is noted that many of the virtual concept definitions are arranged in a hierarchy. At all times, the confidences of the derived concept definitions remain intact, as they are in the existing domain, as the faceted classification synthesis inheritance path is strictly taken into account while deriving the virtual definitions. If the domain facet attribute sets are deeper than the example given here then one may set relative proximity greater than one. Additional virtual definitions are then derivable with deeper structures. The minimum and maximum number of derived virtual concept definitions and the attributes within are selectable in faceted classification synthesis as discussed above.

In addition, limits on the derivation of virtual concept definitions, in any form of semantic processing, may also be based on a confidence gradient or on additional qualitative aspects, such as (and not limited to) having every concept be a possible ancestor of at least one real concept or having no concept with the same descendant set as its parent.

If the domain objects defined as real concept definitions are such that a group of them is exclusively drawing attributes from a certain group of facet attribute sets and another group of real concept definitions is drawing attributes from a different group of facet attribute sets (having disjoint real concept definitions) then the active concept will go through the first group of real concept definitions and then any other disassociated group one at a time until all disjoint groups of real concept definitions are exhausted. As always, caps are selectable based upon a number of properties or just an arbitrary number to limit the active concept going through real concept definitions.

Another interesting outcome of the synthesis process is the resulting simple and broader concepts such as "binning" which might not be readily available in the extracted real definitions. Bins, generally, are concepts that group a number of other concepts based on one or more common (shared) attributes, derived in whole from multiple real to concepts such as V1: {software, computers} in the discussion of formal concept analysis.

In all aspects of the present inventions the unique combination of tree-structure classification with concept synthesis provides a far greater number of structurally pared-down virtual concept definitions and their relationships when compared to the existing real concept definitions extracted in the context of the active concept in focus. This is essentially the main objective of tree-structure synthesis.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable storage medium (e.g., a computer memory, a floppy disk, a compact disk, a tape, and/or other tangible storage media.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user), in the manners described above.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A computer-implemented method for generating at least one concept tree comprising a plurality of concepts and concept relationships, said method comprising:
obtaining, either directly or indirectly via a network, on one or more processors executing software code, input information from a cognitive agent providing a basis for an active concept;

applying, based on the received input information, a semantic processing protocol to a domain of information comprising a data source from which at least one of the plurality of concepts derivable;

generating, from the application of the semantic protocol, from an extraction of concepts from documents, and/or from some combination thereof, the at least one concept tree that includes the plurality of concepts and concept relationships;

wherein at least one of the plurality of concepts has been analyzed for a level of coherence with the active concept;

wherein the cognitive agent includes at least one of a human user, a computer program receiving an input directly or indirectly from a human user, and/or some combination thereof; and wherein the semantic protocol comprises at least one of concept analysis, data analysis, faceted classification synthesis, semantic reasoners, and/or some combination thereof.

2. The method of claim 1, wherein generating the at least one concept tree comprises extracting concepts from at least one of the input information, the domain of information, and/or some combination thereof.

3. The method of claim 1, wherein generating the at least one concept tree comprises assigning a priority level to at least two of the plurality of concepts.

4. The method of claim 1, wherein generating the at least one concept tree comprises representing the at least one concept tree in at least one of a directed or an undirected graph.

5. The method of claim 4, wherein generating the at least one concept tree comprises embodying the at least one concept tree in a knowledge representation comprising a semantic network.

6. The method of claim 1, wherein generating the at least one concept tree comprises executing the semantic processing protocol on a system that is remote from a system on which inputs are received from the cognitive agent.

7. The method of claim 1, wherein the data source included in the domain of information is a natural language data source.

8. The method of claim 1, wherein the data source included in the domain of information is a machine-readable data source generated at least in part by a computer application.

9. A computer-implemented method for generating at least one concept hierarchy comprising a plurality of concepts and concept relationships, said method comprising:

receiving, either directly or indirectly via a network, on one or more processors executing software code, input information from a cognitive agent providing a basis for an active concept;

applying, based on the received input information, a semantic processing protocol to a domain of information comprising a data source from which at least one of the plurality of concepts is derivable;

generating, from the application of the semantic protocol, from an extraction of concepts from documents, and/or from some combination thereof, the at least one concept hierarchy that includes the plurality of concepts and concept relationships;

wherein at least one of the plurality of concepts is determined to have a concept relationship with the active concept comprising at least one of a broader, a narrower, and/or an attributiorial relationship;

wherein the cognitive agent includes at least one of a human user, a computer program receiving an input directly or indirectly from a human user, and/or some combination thereof; and wherein the semantic protocol comprises at least one of concept analysis, data analysis, faceted classification synthesis, semantic reasoners, and/or some combination thereof.

10. The method of claim 9, wherein generating the at least one concept hierarchy comprises forming a concept tree.

11. The method of claim 9, wherein the concept relationships are hierarchical and based on the domain of information.

12. The method of claim 9, wherein generating the at least one concept hierarchy comprises assembling a hierarchy through a semantic protocol.

13. The method of claim 9, wherein generating the at least one concept hierarchy comprises extracting concepts from the input information, the domain of information, and/or some combination thereof.

14. The method of claim 9, wherein generating the at least one concept hierarchy comprises assigning a priority level to at least one of the plurality of concepts.

15. The method of claim 9, wherein generating the at least one concept hierarchy comprises embodying the at least one concept hierarchy in a knowledge representation comprising a semantic network.

16. The method of claim 9, wherein generating the at least one concept hierarchy comprises executing a semantic protocol on a system that is remote from a system on which inputs are received from the cognitive agent.

17. The method of claim 9, wherein the data source included in the domain of information is a natural language data source.

18. The method of claim 9, wherein the data source included in the domain of information is a machine-readable data source generated at least in part by a computer application.

19. A computer system for generating at least one concept tree comprising a plurality of concepts and concept relationships, the system comprising:

at least one non-transitory computer-readable storage medium storing processor-executable instructions that, when executed by at least one processor, perform:

obtaining, either directly or indirectly via a network, on one or more processors executing software code, input information from a cognitive agent providing a basis for an active concept;

applying, based on the received input information, a semantic processing protocol to a domain of information comprising a data source from which at least one of the plurality of concepts is derivable;

generating, from the application of the semantic protocol, from an extraction of concepts from documents, and/or from some combination thereof, the at least one concept tree that includes the plurality of concepts and concept relationships;

wherein at least one of the plurality of concepts has been analyzed for a level of coherence with the active concept;

wherein the cognitive agent includes at least one of a human user, a computer program receiving an input directly or indirectly from a human user, and/or some combination thereof; and wherein the semantic protocol comprises at least one of concept analysis, data analysis, faceted classification synthesis, semantic reasoners, and/or some combination thereof.

* * * * *

UNITED STATES PATENT AND TRADEMARK OFFICE
CERTIFICATE OF CORRECTION

PATENT NO. : 8,943,016 B2  
APPLICATION NO. : 13/919934  
DATED : January 27, 2015  
INVENTOR(S) : Peter Joseph Sweeney et al.

Page 1 of 1

It is certified that error appears in the above-identified patent and that said Letters Patent is hereby corrected as shown below:

Title Page, Item 57:

In the abstract, line 6, please replace "of" with --or--.

In the Claims:

At column 13, claim 9, line 67, please replace "attributiorial" with --attributional--.

Signed and Sealed this
Nineteenth Day of May, 2015

Michelle K. Lee
*Director of the United States Patent and Trademark Office*